US010632475B2

(12) United States Patent
Hoelderle et al.

(10) Patent No.: US 10,632,475 B2
(45) Date of Patent: Apr. 28, 2020

(54) CENTRIFUGE WITH QUICK ACTION CLOSURE SECURING THE ROTOR TO THE DRIVE SHAFT

(71) Applicant: ANDREAS HETTICH GMBH & CO. KG, Tuttlingen (DE)

(72) Inventors: Andreas Hoelderle, Braeunlingen (DE); Klaus-Guenter Eberle, Tuttlingen (DE)

(73) Assignee: ANDREAS HETTICH GMBH & CO. KG, Tuttlingen (DE)

( * ) Notice: Subject to any disclaimer, the term of this patent is extended or adjusted under 35 U.S.C. 154(b) by 373 days.

(21) Appl. No.: 15/505,924

(22) PCT Filed: Jul. 10, 2015

(86) PCT No.: PCT/EP2015/065819
§ 371 (c)(1),
(2) Date: Feb. 23, 2017

(87) PCT Pub. No.: WO2016/030070
PCT Pub. Date: Mar. 3, 2016

(65) Prior Publication Data
US 2017/0252754 A1 Sep. 7, 2017

(30) Foreign Application Priority Data

Aug. 29, 2014 (DE) ......................... 10 2014 112 501

(51) Int. Cl.
*B04B 9/08* (2006.01)
*B04B 7/06* (2006.01)
(Continued)

(52) U.S. Cl.
CPC .................. *B04B 9/08* (2013.01); *B04B 7/06* (2013.01); *F16D 1/108* (2013.01);
(Continued)

(58) Field of Classification Search
CPC ....... B04B 9/08; B04B 2009/085; B04B 7/06; B04B 7/00; B04B 9/00; B04B 7/08;
(Continued)

(56) References Cited

U.S. PATENT DOCUMENTS 2,329,499 A * 9/1943 Weaver ..................... D01D 7/02
57/77
2,827,229 A * 3/1958 Blum ..................... B04B 5/0414
464/91
(Continued)

FOREIGN PATENT DOCUMENTS

CN 1480262 3/2004
CN 2714876 8/2005
(Continued)

OTHER PUBLICATIONS

European Patent Office, International Search Report, dated Jul. 10, 2015, pp. 1-3, Application No. PCT/EP2015/065819, Applicant: Andreas Hettich Gmbh & Co. KG.
(Continued)

*Primary Examiner* — Charles Cooley
(74) *Attorney, Agent, or Firm* — Woodling, Krost and Rust (57) ABSTRACT

A centrifuge (10), having a drive shaft (12), a rotor (40) mounted on the drive shaft (12) so as to be detachable axially in a removal direction (66), a quick-action closure (54) integrated in the rotor (40) and the drive shaft (12), which closure can be used to secure the rotor (40) relative to the drive shaft (12) in a removal direction (66), an abutment (50, 52) in the drive shaft (12) which is engaged by a locking member (46) of the rotor (40), at least one blocking element (76), which—when activated—fixes the rotor (40) relative to the drive shaft (12) and which acts between the locking member (46) of the rotor (40) and the abutment (50, 52) of the drive shaft (12), which quick-action closure (54)
(Continued)

includes a force-transmitting element (58, 72). The blocking element (76) is actively connected to an actuating element (100, 100*a*) via the force-transmitting element (58, 72), that unlocking the quick-action closure (54) is effected by moving the actuating element (100, 100*a*), the force-transmitting element (58, 72) and the blocking element (76) relative to the locking member (46) in a direction in parallel to the drive shaft (12), and that during unlocking, the actuating element (100, 100*a*) is moved toward the drive shaft (12), and during locking, the force-transmitting element (58, 72) and the blocking element (76) on the one side and the locking member (46) on the other side are relatively moved toward each other.

14 Claims, 7 Drawing Sheets

(51) Int. Cl.
  *B04B 7/02*   (2006.01)
  *F16B 21/16*  (2006.01)
  *F16D 1/108*  (2006.01)
  *F16D 1/00*   (2006.01)

(52) U.S. Cl.
  CPC ... *B04B 2007/025* (2013.01); *B04B 2009/085* (2013.01); *F16B 21/16* (2013.01); *F16D 1/00* (2013.01)

(58) Field of Classification Search
  CPC ... B04B 5/0414; B04B 7/02; B04B 2007/025; F16D 1/108; F16D 1/00; F16B 21/16
  USPC ..................................... 494/16, 12
  See application file for complete search history.

(56) References Cited

U.S. PATENT DOCUMENTS

| | | | | | |
|---|---|---|---|---|---|
| 2,865,662 | A * | 12/1958 | Nurmse | ............ | A01K 89/0111 242/318 |
| 3,819,111 | A * | 6/1974 | Romanauskas | ....... | B04B 5/0414 494/16 |
| 3,961,745 | A * | 6/1976 | Wright | ................ | B04B 7/06 494/9 |
| 4,193,538 | A * | 3/1980 | Schwarz | ............ | B04B 5/0414 494/16 |
| 4,412,830 | A * | 11/1983 | Strain | ................ | B04B 7/02 494/12 |
| 4,435,169 | A * | 3/1984 | Romanauskas | ....... | B04B 5/0421 494/20 |
| 4,753,631 | A * | 6/1988 | Romanauskas | ....... | B04B 5/0414 494/12 |
| 5,342,282 | A * | 8/1994 | Letourneur | ............ | B04B 9/12 384/480 |
| 5,344,380 | A * | 9/1994 | Chern | ................ | B04B 5/0414 494/12 |
| 5,411,465 | A * | 5/1995 | Glen | ................ | B04B 5/0414 494/16 |
| 5,681,257 | A * | 10/1997 | Letourneur | ............ | B04B 9/08 403/325 |
| 5,897,482 | A * | 4/1999 | Lowe | ................ | B04B 5/0414 411/424 |
| 6,056,684 | A * | 5/2000 | Linder | ................ | B04B 7/02 494/12 |
| 6,063,018 | A * | 5/2000 | Letourneur | ............ | B04B 9/08 403/327 |
| 6,149,570 | A * | 11/2000 | Lowe | ................ | B04B 5/0414 494/12 |
| 6,665,924 | B2 * | 12/2003 | Schutz | ............ | B04B 5/0414 29/525.11 |
| 6,764,438 | B2 * | 7/2004 | Potter | ............ | B04B 5/0414 494/12 |
| 6,776,751 | B2 * | 8/2004 | Potter | ............ | B04B 9/08 494/12 |
| 6,802,803 | B2 * | 10/2004 | Potter | ............ | B04B 5/0414 494/12 |
| 6,953,424 | B2 | 10/2005 | Kusumoto et al. | | |
| 6,981,304 | B2 * | 1/2006 | Potter | ............ | B04B 5/0414 29/428 |
| 7,011,618 | B2 * | 3/2006 | Potter | ............ | B04B 9/08 494/12 |
| 7,081,081 | B2 * | 7/2006 | Schutz | ............ | B04B 9/08 494/12 |
| 7,137,198 | B2 * | 11/2006 | Potter | ............ | B04B 5/0414 29/889 |
| 7,311,652 | B2 * | 12/2007 | Henne | ............ | B04B 5/0414 494/12 |
| 7,419,464 | B2 * | 9/2008 | Matusima | ............ | B04B 9/08 403/322.2 |
| 7,464,450 | B2 * | 12/2008 | Potter | ............ | B04B 9/08 29/428 |
| 7,837,607 | B2 * | 11/2010 | Woodman | ............ | B04B 5/0421 494/12 |
| 8,678,987 | B2 * | 3/2014 | Henne | ............ | B04B 9/08 494/12 |
| 9,409,187 | B2 | 8/2016 | Meisberger et al. | | |
| 9,718,067 | B2 * | 8/2017 | Ballhause | ............ | B04B 9/00 |
| 9,782,783 | B2 * | 10/2017 | Bittner | ............ | B04B 9/08 |
| 10,300,499 | B2 * | 5/2019 | Hornek | ............ | B04B 9/08 |
| 10,486,170 | B2 * | 11/2019 | Hornek | ............ | B04B 7/02 |
| 10,493,469 | B2 * | 12/2019 | Hornek | ............ | B04B 9/00 |
| 2003/0144124 | A1 * | 7/2003 | Schutz | ............ | B04B 5/0414 494/12 |
| 2003/0196310 | A1 * | 10/2003 | Potter | ............ | B04B 5/0414 29/428 |
| 2003/0199380 | A1 * | 10/2003 | Potter | ............ | B04B 9/08 494/12 |
| 2003/0199381 | A1 * | 10/2003 | Potter | ............ | B04B 5/0414 494/12 |
| 2004/0018928 | A1 * | 1/2004 | Schutz | ............ | B04B 9/08 494/12 |
| 2004/0220037 | A1 * | 11/2004 | Potter | ............ | B04B 5/0414 494/12 |
| 2004/0224831 | A1 * | 11/2004 | Potter | ............ | B04B 5/0414 494/12 |
| 2004/0229742 | A1 * | 11/2004 | Potter | ............ | B04B 9/08 494/12 |
| 2005/0221971 | A1 * | 10/2005 | Potter | ............ | B04B 9/08 494/37 |
| 2006/0058169 | A1 * | 3/2006 | Matusima | ............ | B04B 9/08 494/84 |
| 2006/0240963 | A1 * | 10/2006 | Henne | ............ | B04B 5/0414 494/16 |
| 2008/0146429 | A1 * | 6/2008 | Woodman | ............ | B04B 5/0421 494/12 |
| 2011/0212822 | A1 * | 9/2011 | Henne | ............ | B04B 9/08 494/84 |
| 2013/0188894 | A1 * | 7/2013 | Peters | ............ | B04B 9/08 384/91 |
| 2014/0329658 | A1 * | 11/2014 | Le Guyader | ............ | B04B 9/08 494/82 |
| 2016/0158769 | A1 * | 6/2016 | Hornek | ............ | B04B 9/08 494/83 |
| 2017/0050195 | A1 * | 2/2017 | Hornek | ............ | B04B 5/0414 |
| 2017/0252754 | A1 * | 9/2017 | Hoelderle | ............ | B04B 9/08 |
| 2018/0318847 | A1 * | 11/2018 | Luersmann | ............ | B04B 1/08 |
| 2019/0299221 | A1 * | 10/2019 | Tomaru | ............ | B04B 7/06 |

FOREIGN PATENT DOCUMENTS

| | | | |
|---|---|---|---|
| CN | 104520011 | 4/2015 | |
| DE | 19930593 A1 * | 4/2000 | ............ B04B 9/08 |
| DE | 69514988 | 10/2000 | |
| DE | 69810060 | 10/2003 | |
| DE | 202010014803 | 2/2011 | |
| EP | 0712667 | 5/1996 | |

(56) References Cited

FOREIGN PATENT DOCUMENTS

| JP | 2006272330 A | * | 10/2006 | ........... B04B 5/0414 |
| WO | WO-8304379 A1 | * | 12/1983 | ........... B04B 5/0414 |
| WO | 2011054906 | | 5/2011 | |
| WO | WO-2019121214 A1 | * | 6/2019 | ............... B04B 5/04 |
| WO | WO-2019121581 A1 | * | 6/2019 | ........... B04B 5/0414 |

OTHER PUBLICATIONS

German Patent and Trademark Office, German Search Report, dated Apr. 30, 2015, pp. 1-10, Application No. 102014112501.0, Applicant: Andreas Hettich Gmbh & Co. KG.

German Patent and Trademark Office, German Examination Report, dated Sep. 21, 2009, pp. 1-4, Application No. 102014112501.0, Applicant: Andreas Hettich Gmbh & Co. KG.

European Patent Office, Written Opinion of the Search Report, pp. 1-5, Application No. PCT/EP2015/065819, Applicant: Andreas Hettich Gmbh & Co. KG.

The State Intellectual Property Office of China, First Office Action, dated Aug. 29, 2018, Application No. 201580046590.4, Applicant: Andreas Hettich Gmbh & Co. KG.

* cited by examiner

CENTRIFUGE WITH QUICK ACTION CLOSURE SECURING THE ROTOR TO THE DRIVE SHAFT

This patent application is the national phase entry of PCT/EP2015/065819, international application filing date Jul. 10, 2015, and claims the benefit and priority of and to German patent application no. 10 2014 112 501.0, filed Mar. 21, 2014. PCT/EP2015/065819, international application filing date Jul. 10, 2015, and German patent application no. DE No. 10 2014 112 501.0, filed Aug. 29, 2014, are incorporated herein by reference hereto in their entireties.

BACKGROUND OF THE INVENTION

The invention relates to a centrifuge.

Centrifuges with a detachable rotor are already known which have means for axially locking the rotor on the drive shaft and thus do not require any complex mounting procedures or special tools for locking. DE 695 14 988 T2, for example, proposes a centrifuge in which the rotor automatically moves into locking position when placed on the centrifuge. More specifically, a spring-loaded bolt engages a recess in the drive shaft, thus ensuring axial locking of the rotor. However, the disadvantage here is that a substantial portion of the drive shaft has to penetrate the rotor to provide sufficient contact surface for the locking mechanism, and that locking is effected underneath the rotor. This requires a greater amount of space. Moreover, providing part of the locking mechanism in the drive shaft will weaken the latter. This thus limits the resulting admissible speed and/or durability of such designs.

Known from DE 20 2010 014 803 U1 is a centrifuge of the generic type. This centrifuge has a rotor bearing including a locking system which secures the rotor to the drive shaft. The locking system has axes that extend perpendicular to the axis of rotation, and locking levers that can be pivoted about said axes between a locking position and an unlocking position. In the locking position, the locking levers engage an annular groove in the drive shaft, thus securing the rotor axially on the shaft. Depending on the speed of rotation, the locking levers can be automatically moved from the unlocking position into the locking position. At approx. 600 rpm, laboratory centrifuges frequently pass through their first resonance. However, at such speeds it is impossible for the generic centrifuge to achieve any major axial retention force.

Disclosed in WO 2011/054906 A1 is a centrifuge having a rotor that can be connected to a drive shaft by means of a locking mechanism. The locking mechanism has blades which can be pivoted about axes extending in parallel to the drive shaft, and which have a mass distribution such that they will be retained in the locking position, depending on the speed. The blades engage an annular groove in the drive shaft.

US 2008/0146429 A1 discloses a single locking member which can be moved from an unlocking position into a locking position by means of a handle perpendicular to the drive shaft.

SUMMARY OF THE INVENTION

It is the object of the present invention to provide a centrifuge with a detachable rotor that overcomes the above mentioned disadvantages and has a simple and reliable quick-action closure which securely locks the rotor axially, especially also independent of the speed. In particular, the locking mechanism is to also require less space in the area of the rotor for locking.

The invention is based on the finding that it is possible to ensure that the rotor is reliably secured axially in the removal direction of rotor and drive shaft when the rotor is fitted on the drive shaft, by means of a closing device in which a widened portion of the drive shaft extends through a rotor opening, and a closure device between the rotor and the widened portion blocks the opening so as to fix the rotor relative to the drive shaft in the removal direction. This is a simple approach to reliably secure the rotor to the drive shaft and to safely hold the rotor in place within the centrifuge, even at high speeds and during the resulting elastic deformation of centrifuge components, using means that are easy to produce.

In accordance with the invention, the centrifuge has a drive shaft, a rotor which is supported on the drive shaft and can be removed axially in a removal direction, a quick-action closure integrated in the rotor and the drive shaft, which closure acts to secure the rotor relative to the drive shaft in the removal direction, an abutment in the drive shaft which is engaged by a locking portion of the rotor, and at least one blocking element which—when activated—fixes the rotor relative to the drive shaft and which acts between the locking portion of the rotor and the abutment of the drive shaft. The quick-action closure has a force-transmitting element. It has proven particularly advantageous for the blocking element to be actively connected to a handle via the force-transmitting element, and for the locking and/or unlocking of the quick-action closure to be each effected by moving the handle and the force-transmitting element in a direction parallel to the drive shaft, wherein, during unlocking, the handle is moved in the direction of the drive shaft, and during locking, the handle is moved in the opposite direction. In this arrangement, fitting and removing the rotor can be combined well with locking and unlocking the rotor. Owing to the small number of components required, this solution is relatively fail-safe. Moreover, this design has the advantage that only a relatively small end portion of the drive shaft has to be used for axially securing the rotor to the drive shaft, and that it does not require a locking mechanism that exerts a lateral force and for which a certain length portion of the drive shaft will be required. This approach thus requires less space and avoids a weakening of the drive shaft. Moreover, the rotor will always be reliably secured, regardless of speed.

In the locking position, it is advantageous for the blocking element to be pre-loaded into the locking position by a spring force, for which purpose at least one spring should be provided. This will increase the retention force.

To secure the rotor even more reliably to the drive shaft, plural blocking elements can be provided which, in the locking position, are arranged around the locking member uniformly spaced from each other. This also makes it easier to give the quick-action closure a completely rotationally symmetrical design, so as to minimize the risk of imbalances.

In one aspect of the invention, the blocking elements are connected to springs, in particular elastically deflectable fingers. These fingers in turn are connected to a common support, in which case the blocking elements are pre-loaded in the direction of the locking member. This spring-loading and the arrangement of the fingers on a common support ensures that the blocking elements will easily move into their intended position between the locking member and the abutment when the rotor is fitted on the centrifuge, thus securing the rotor axially to the drive shaft.

In yet another advantageous embodiment, the blocking elements, the springs and the support are formed as an integral unit that constitutes a locking unit. This reduces the number of components and facilitates mounting.

To further improve the blocking action, the shape of the blocking element is adapted to the region of the locking member associated with it.

Further simplification, in particular of the locking action, will also be achieved by a locking member that is rotationally symmetrical in design, since this will make it irrelevant how many blocking elements there are and how the rotor is oriented in the horizontal when the rotor is placed on the centrifuge. It is particularly advantageous for the locking member to first widen conically in the direction of the drive shaft and then narrow again in certain regions.

Preferably, the locking member is integrally formed with the rotor and also made of the same material. This further reduces the number of components and thus achieves increased stability.

In an advantageous embodiment of the invention, the locking unit is mounted on a locking piston which is loaded into the locking position by locking springs. The spring loading acts to ensure that the blocking elements end up completely surrounding the locking member against the pressure exerted on the blocking elements by the locking member during insertion of the rotor. The locking piston serves as a connecting link between the locking springs and the locking unit. It can be used to firmly mount the locking springs on its one side which faces the motor. Its other side, which faces the rotor, has sufficient surface for accommodating the locking unit and for correcting any slipping or tilting of the locking unit in the locking chamber as a result of improper placement of the rotor, for example.

To further automatize the locking process and make it even more stable, the drive shaft has a stop against which the locking piston is held in a maximum opening position thereof.

A particular simple design of the mechanism for unlocking the quick-action closure is to provide the force-transmitting element in the form of a pin which is connected to the handle. Pressing the handle toward the motor will urge the locking unit, together with the locking piston, away from the locking member and press it against the stop. As a result, the blocking elements will be deflected along the outer contour of the locking member, which eliminates the axial locking of the rotor on the drive shaft, thus allowing the rotor to be removed.

In another aspect of the invention, the abutment is part of the boundary of a locking chamber which has an opening for inserting the locking member, which chamber is engaged by the locking member of the rotor and which accommodates the locking unit, the locking piston, the locking springs and the stop. Providing the locking chamber and the abutment as an integral unit will make the locking even more reliable.

In order to avoid the occurrence of imbalances, it is advantageous to arrange the locking member, the locking chamber, the locking unit, the handle and/or the drive shaft concentrically to one another.

To facilitate mounting and removal, the blocking elements for unlocking and locking the quick-action closure can be elastically deflected by the spring in such a way that the blocking elements will be able to pass the widest portion, relative to the drive shaft central axis, of the locking member.

In a preferred embodiment, the locking member has a control surface for the blocking elements, along which the blocking elements are moved toward the drive shaft and guided into the locking position against the drive shaft when the rotor is inserted by moving it in a direction opposite to the removal direction into a locking position of the quick-action closure. The same applies when the rotor is removed.

Further advantages, features and possible applications of the present invention may be gathered from the description which follows, in which reference is made to the embodiments illustrated in the drawings.

Throughout the description, the claims and the drawings, those terms and associated reference signs are used as are listed in the List of Reference Signs which follows below.

DESCRIPTION OF THE INVENTION

Figure 1:
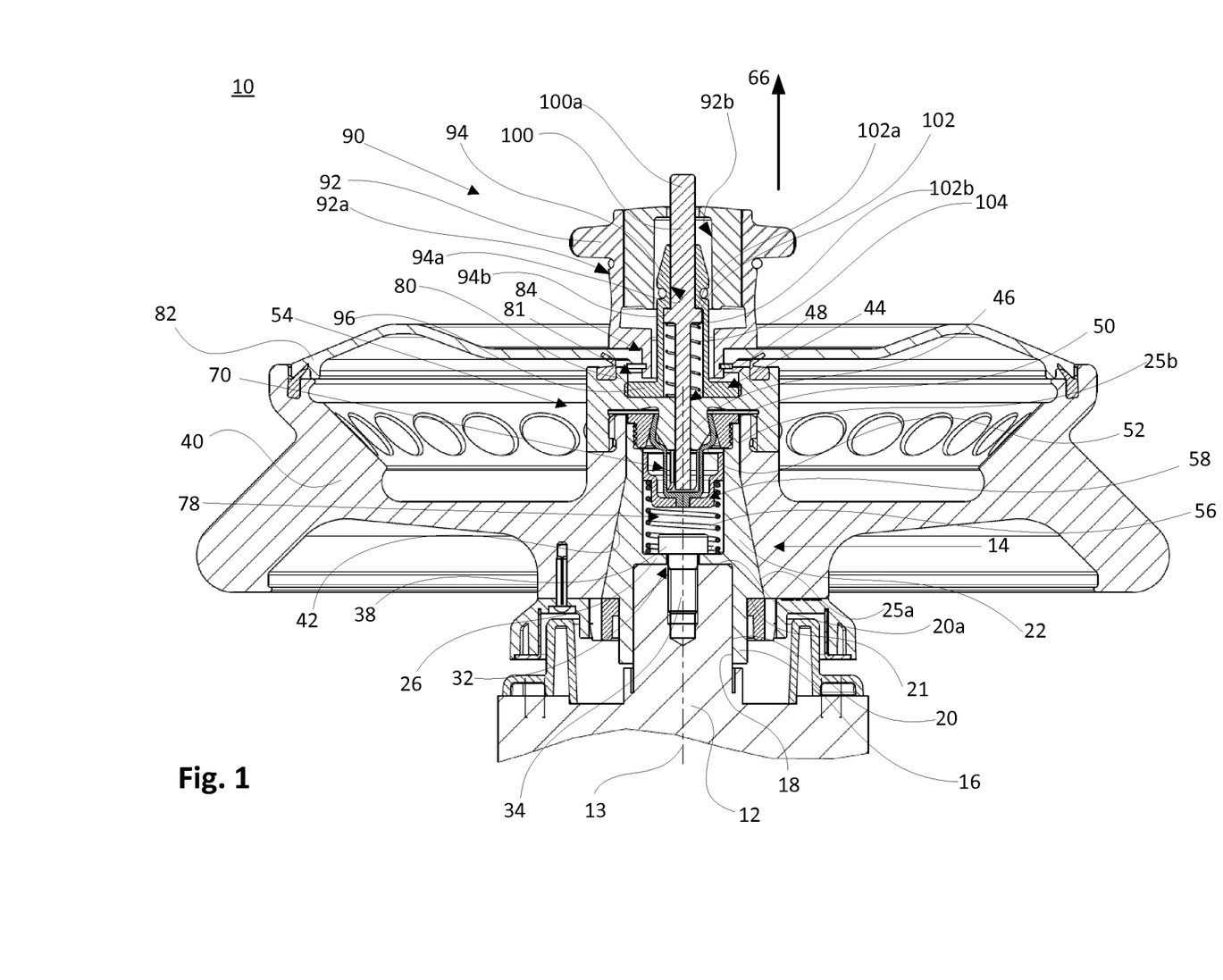
FIG. 1 is a sectional view of an angle rotor having a lid and a drive shaft along the central axis of the centrifuge, in accordance with a first embodiment of the invention.
Figure 2:
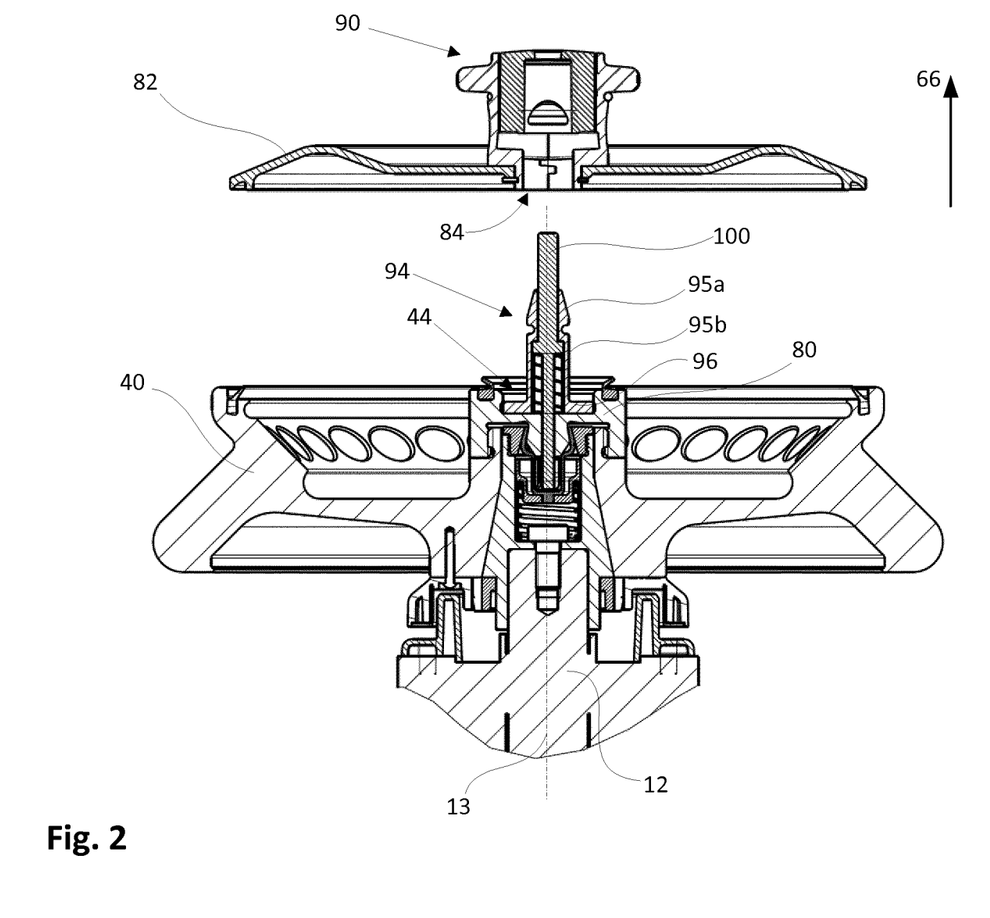
FIG. 2 is a sectional view of the rotor and the drive shaft of FIG. 1, with the lid removed.
Figure 4:
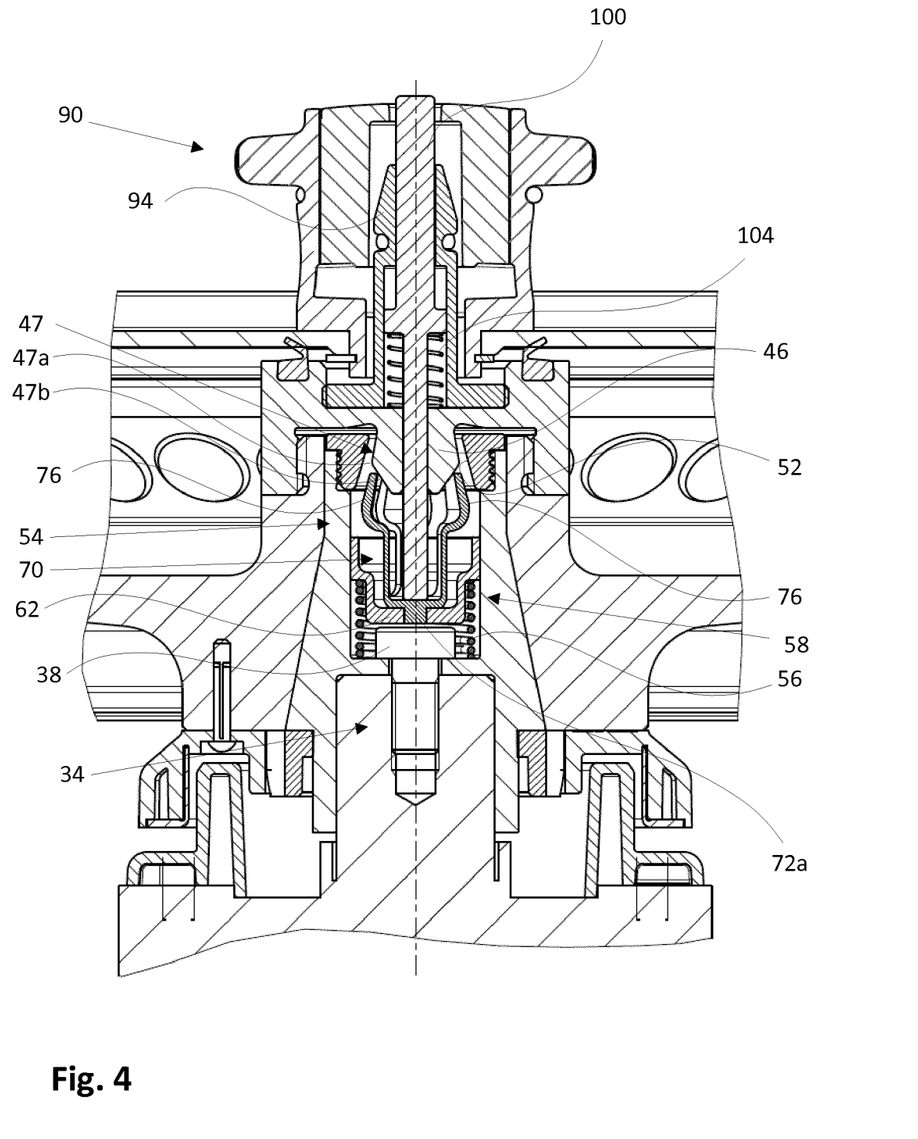
FIG. 4 is an enlarged view of a detail of FIG. 1, with the quick-action closure in the unlocked state, but with the rotor still in place on the shaft.
Figure 5:
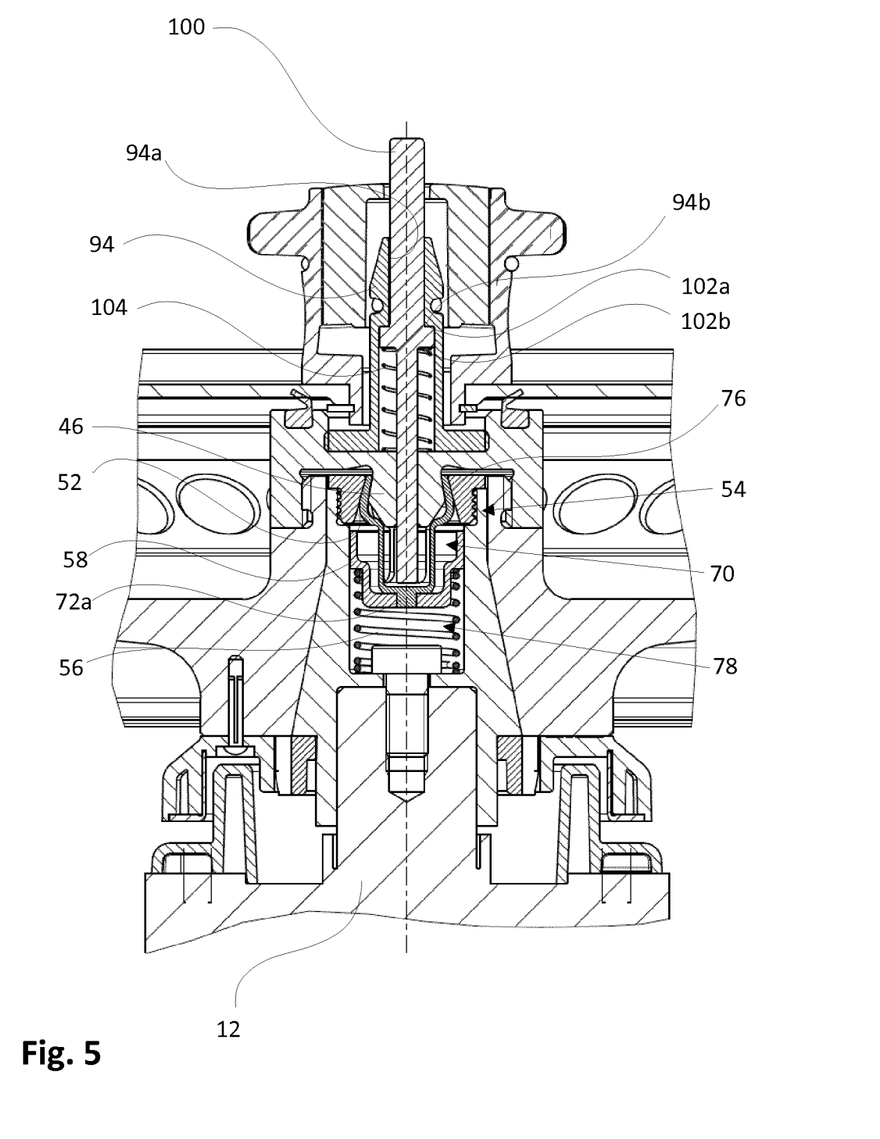
FIG. 5 is an enlarged view of a detail of FIG. 1 with the quick-action closure in the locked state of rotor and drive shaft.

FIG. 1 is a schematic view of a vertical section through a centrifuge generally indicated at 10 with an angle rotor, in accordance with a first embodiment of the invention. For the sake of clarity, the substructure is not shown, merely the upper portion of a drive shaft 12 is schematically indicated. A rotor 40 is mounted on the drive shaft 12. To provide a clearer illustration, FIG. 4 is an enlarged view of a detail of FIG. 1 in an unlocked state thereof, and FIG. 5 is an enlarged view of a detail of FIG. 1 in a locked state thereof. FIGS. 6*a*, 6*b* and 7*a*, 7*b* are views of a second embodiment of the invention in which the centrifuge has a swing-out rotor without a lid. On the drive side, however, locking/unlocking is achieved in the same manner as in the first embodiment.

In the embodiment illustrated in the drawings, the centrifuge 10 comprises a cylindrical drive shaft 12 and an adapter 14 which is mounted on the drive shaft 12 and non-rotatably connected to the latter. Mounted on the adapter 14 and concentrically arranged thereon is a rotor hub 42 of a rotor 40. The adapter 14 and the rotor hub 42 and thus the drive shaft 12 and the rotor 40 are non-rotatably connected in a manner set out below. The rotor 40 comprises a quick-action closure 54. This quick-action closure 54 is used to connect the rotor 40 to the adapter 14 and thus to the drive shaft 12.

The adapter 14 can also be designed as an integral unit with the drive shaft 12 and accordingly adapt the rotor hub 42. Otherwise the adapter 14 is optional. As an alternative, the drive shaft 12 can also be designed so as to directly accommodate the rotor hub 42.

Figure 6A:
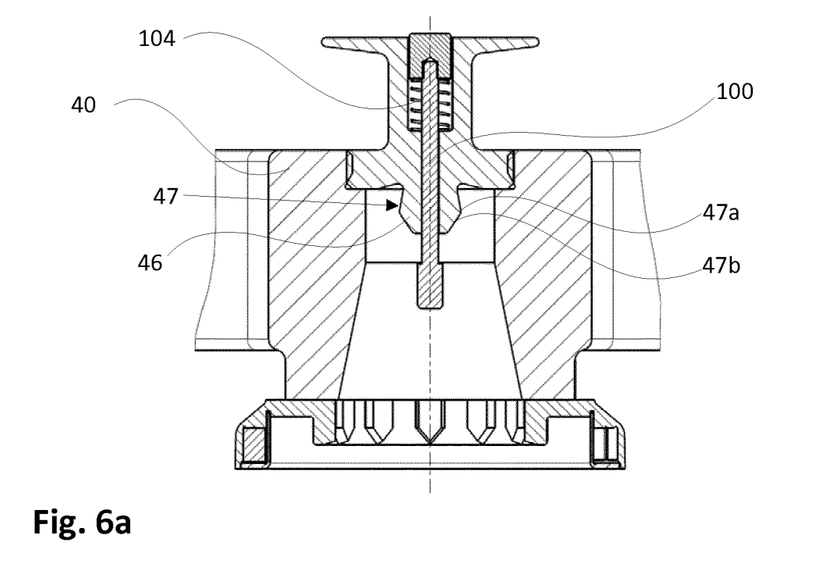
FIG. 6*a* is a sectional view of a swing-out rotor without a lid and having a handle for unlocking, in a state in which the rotor has been removed from the drive shaft, in which the pin and the spring are not yet released, in accordance with another embodiment of the invention.
Figure 6B:
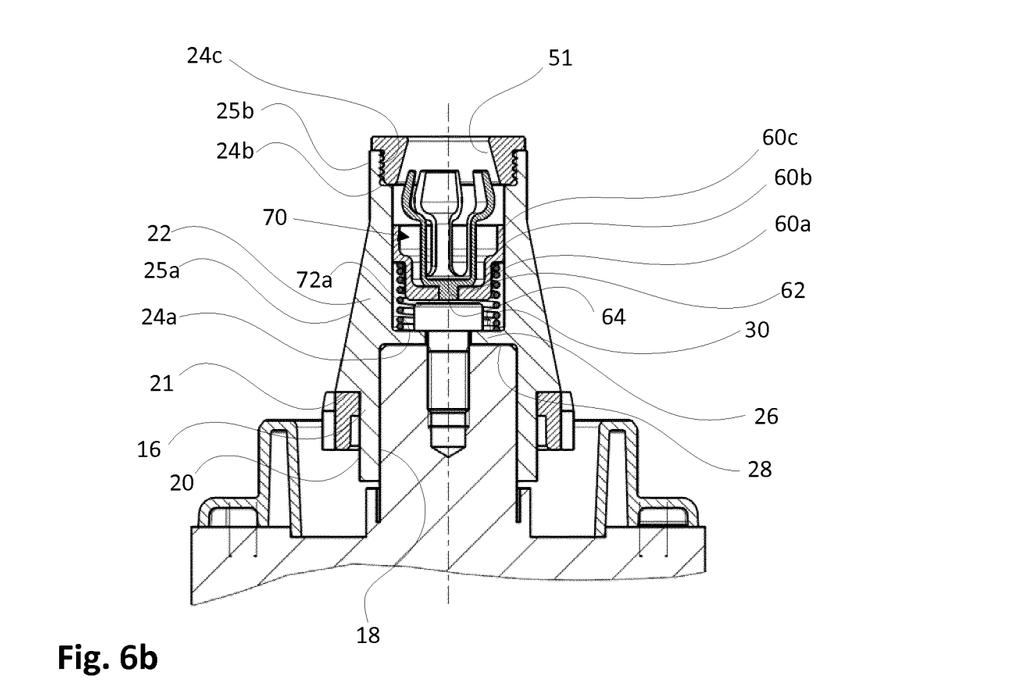
FIG. 6*b* is a sectional view of part of the drive shaft, in which the rotor of FIG. 6*a* has been removed, but the spring is still tensioned and the locking piston has not yet been moved into contact with the stop.
Figure 7A:
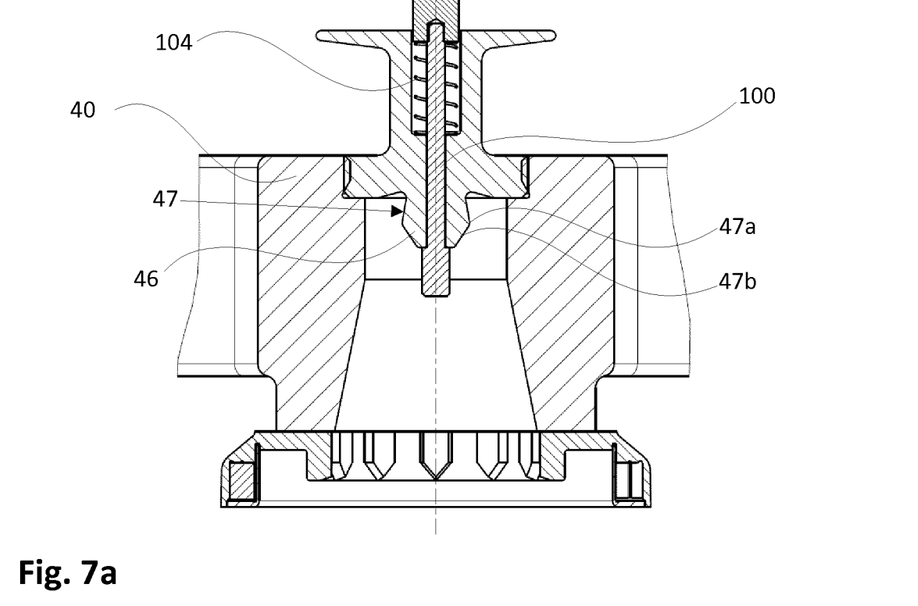
FIG. 7*a* is a sectional view of part of the rotor, in a state in which the rotor has been removed from the drive shaft as in FIG. 6*a*, but with the spring released.
Figure 7B:
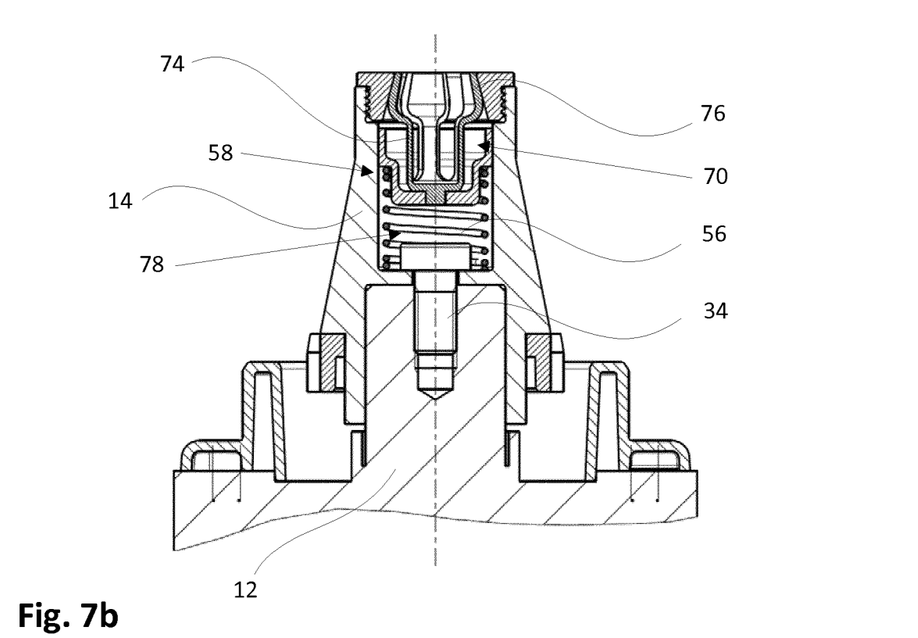
FIG. 7*b* is a sectional view of part of the drive shaft, with the rotor removed, as in FIG. 6*b*, but with the spring released and the locking piston moved into contact with the stop.

As seen in FIGS. 6b and 7b, the adapter 14 has a lower circumferential wall 16, as viewed in a removal direction 66, which surrounds the end section of the drive shaft 12 on its cylindrical outer side 20 and its top front face 20a. The lower circumferential wall 16 has an inner contour 18 which is adapted to the free end of the drive shaft 12 and rests against it. Moreover, an upper circumferential wall 22 is provided which has an inner contour 24a, 24b, 24c and an outer contour 25a, 25b. The inner contour 24a, 24b, 24c of the upper circumferential wall 22 is formed in two parts and provided with a longer segment 24a whose rotor-side end is followed by a shoulder 24b. This shoulder 24b in turn is followed by a shorter segment 24c having an inner diameter that is wider than the longer segment 24a. Between the inner contour 18 of the lower circumferential wall 16 and the inner contour 24a, 24b, 24c of the upper circumferential wall 22 is a dividing wall 26 which has a bottom side 28, a top side 30 and a concentric threaded hole 32. The bottom side 28 rests against the front face 20a of the drive shaft 12. A threaded bolt 34 engages the concentric threaded hole 32 in the dividing wall 26. Furthermore, the front face 20a of the drive shaft 12 is provided with pins which engage bores in the dividing wall 26. These are not shown here for the sake of clarity. In this way, the drive shaft 12 and the adapter 14 are non-rotatably connected to each other.

Alternatively, the drive shaft 12 has a cone for centering the adapter 14 on the drive shaft 12, which cone widens in a direction opposite to the removal direction 66. The adapter 14 is suitably adapted to the outer shape of the drive shaft 12. The adapter and the drive shaft are screwed together for the transmission of torque.

The outer contour 25a, 25b of the adapters 14 is essentially adapted to the inner profile of the rotor hub 42 and, viewed from a shoulder 21, first extends in the form of a cone 25a which tapers towards the top, then in the form of a cylinder 25b.

The inner profile of the rotor hub 42 extends beyond the end of the upper circumferential wall 22 of the adapter 14 which is free at the top, and then transitions into a rotor central area 44 which is non-rotatably connected to the rotor hub 42.

For axially securing it in place, the rotor central area 44 has a locking member 46 which projects into the adapter 14 and has an outer contour 47 whose diameter, viewed in a direction opposite the removal direction 66, first widens up to a widest point 47a and then decreases again. The area of the outer contour 47 in which the circumference decreases in a direction opposite the removal direction 66, constitutes a control surface 47b whose function will be described below. The locking member 46 is spaced from the inner contour 24a, 24b, 24c of the adapter 14 and extends in an axial direction up to approx. the shoulder 24b of the inner contour 24a, 24b, 24c of the adapter 14. A bore 48 is provided in the locking member 46, which bore 48 extends concentrically to the drive axle 13.

Figure 3:
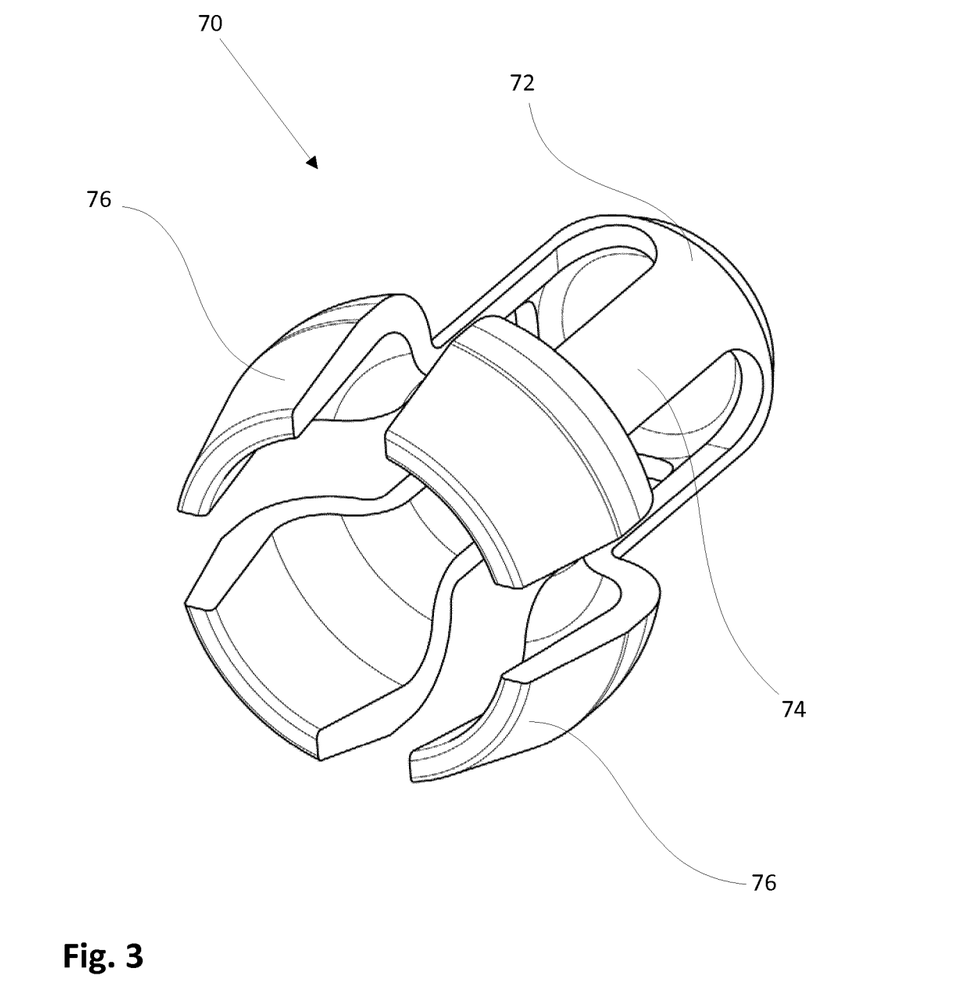
FIG. 3 is a perspective detail view of the integral unit of locking springs and blocking elements.

Located within the adapter 14 above the dividing wall 26 is the shaft-side portion of the quick-action closure 54. This portion comprises a locking unit 70 shown in perspective view in FIG. 3 which consists of four locking springs 74 interconnected via a connecting ring 72 and which have a blocking element 76 each mounted on their respective ends. The locking unit 70 is mounted on a locking piston 58 which is loaded in the removal direction 66 by a spring 56 that rests against the dividing wall 26. The outer contour 60a, 60b, 60c of the locking piston 58, at its end facing the drive shaft 12, has a cylindrical segment 60a that is spaced from the inner contour 24a, 24b, 24c of the adapter 14. This is followed by a shoulder 60b which is in turn followed by a cylindrical segment 60c which rests against the inner contour 24a, 24b, 24c of the adapter 14 and can be moved along the inner contour. The cylindrical segment 60a is surrounded by an end portion of the spring 56 which rests against the shoulder 60b. In a bottom segment 62 of the locking piston 58 a recess 64 is provided which is engaged by a locating pin 72a which is mounted on the connecting ring 72 on the side opposite the locking springs 74.

An abutment insert 50 is screwed into the segment 24c of the adapter 14 and extends along the end of the segment 24c open to the top and whose outer contour above the segment 24c has been adapted to the inner contour of the rotor central area 44. The abutment insert 50 includes a bore 51 whose upper end is dimensioned such that it will allow the widest point 47a of the locking member 46 to pass through it. The bore 51 widens conically towards the bottom and forms an abutment surface 52 whose function will be explained below.

The inner contour 24a, 24b, 24c of the adapter 14, together with the abutment surface 52 of the abutment insert 50 and, with the rotor 40 in place, the outer contour 47 of the locking member 46, defines the boundary of a locking chamber 78 in which the rotor 40 is locked and/or unlocked and thus axially secured in place.

Provided above the rotor 40 is a detachable lid 82 which forms a non-detachable unit with a handle 90. The handle 90 is mounted on the top of the lid 82 so as to be concentric with the drive shaft 13, with the housing 92 of the handle 90 having a rotationally symmetrical outer contour 92a and a cylindrical inner contour 92b and partially extending through a recess 84 of the lid 82.

Provided at the top of the rotor central area 44 and extending concentrically relative to the drive shaft 13 is a wall 80. A centering pin 94 which has a flange-like locating ring 96 mounted on its drive-side end is likewise mounted concentrically within the wall 80 and screwed to the wall 80 via the locating ring 96 and thus connected to the rotor 40. The centering pin 94 has a free end 95a whose outer contour tapers conically in the removal direction, as well as a cylinder 95b which is arranged between the free end 95a and the locating ring 96. When the lid 82 is in place, the free end 95a and the cylinder 95b engage the housing 92 of the handle 90. The outer contour of the cylinder 95b is adapted to the inner contour 92b of the housing 92 so as to secure the lid 82 in place, while the outer contour of the free end 95a is conical in shape so as to facilitate centering of the lid 82 when it is being fitted. A snap lock is used to detach the lid 82 with the handle 90 from the centering pin 94.

The rotor side part of the quick-action closure 54 is essentially located on the inside of the handle 90 and in particular of the centering pin 94. It comprises an actuating pin 100 whose length is longer than the axial length of the handle 90 and which reaches through the locking member 46 on the side of the shaft and comes to bear against the bottom area 62 of the locking piston 58. Furthermore, the rotor-side part of the quick-action closure 54 comprises a spring 104 which acts on the actuating pin 100 in the removal direction 66. An inner contour 94a of the centering pin 94 partially serves as a guide tube for the actuating pin 100. In order to limit the vertical displacement of the actuating pin 100 in the removal direction 66, a circumferential cross piece 102 is provided which serves to widen the diameter of the actuating pin 100. On the side facing the handle 90, the cross piece 102 forms a shoulder 102a together with the actuating pin 100, which shoulder will come to bear against an associated shoulder 94b of the inner contour 94a of the centering pin 94 when the actuating pin 100 is moved in the removal direction 66, thus preventing further displacement. On the opposite side, as viewed in an axial direction, the cross piece 102 forms a shoulder 102b with the actuating pin 100, which shoulder forms a contact surface for the spring 104. At its end facing away from the shoulder 102b, the spring 104 rests on the rotor 40 in the receiving section 81 for the handle 90 which is limited by the wall 80. Alternatively, the spring 104 can also be omitted, in which case the actuating pin 100 will only cooperate with the locking piston 58 which is acted upon by the spring 56. For both options, the free end of the actuating pin 100 constitutes an actuating button 100a. Unlocking is accomplished through the cooperation of the handle 90 and the actuating button 100a. The actuating button 100a needs to be depressed, in which case the handle serves as an abutment for the user, then the rotor 40 can be removed, in particular using the handle 90.

FIG. 4 is a view of the quick-action closure 54 in an unlocked state thereof, as shown in a detail of a cross-section taken along the central axis of the centrifuge of FIG. 1, with the rotor 40 still in place on the adapter 14, however. The actuating pin 100 is depressed in a direction opposite to the removal direction 66 against the action of the spring 104. This also causes the locking piston 58, whose bottom area 62 is in contact with the actuating pin 100 on a shaft-side thereof, to be displaced in the locking chamber 78 in a direction opposite to the removal direction 66 and against the action of the spring 56 and thus rests against the head 38 of the threaded bolt 34. The locking unit 70 which is anchored in the bottom area 62 of the locking piston 58 by the locating pin 72a is likewise displaced in the direction of the drive shaft 12, thus causing the free ends of the blocking elements 76 to abut on the control surface 47b of the locking member 46 and thus be outside their locking position between the locking member 46 and the abutment surface 52.

For more clarity, FIGS. 6a and 6b are views of the rotor-side detail (FIG. 6a) and the shaft-side detail (FIG. 6b) separate from each other.

For locking, the pressure on the actuating pin 100 is relieved in a direction opposite to the removal direction 66. When fitting the rotor, the actuating pin 100 will not have to be operated manually for this purpose, the weight force of the rotor 40 and a slight downward pressure exerted by the user, if necessary, will suffice. This will cause the locking piston 58 and thus also the locking unit 70 mounted on the locking piston 58 to be displaced in the removal direction 66, due to the action of the spring 56. In this process, the blocking elements 76 will slide along the control surface 47b of the locking member 46 and past the widest point 47a, and into their locking position between the outer contour 47 of the locking member 46 and the abutment surface 52. The weight force of the rotor 40 counteracts the blocking elements 76 of the locking unit 70 which slide over the control surface 47b. Owing to the resilient design of the locking springs 74, the blocking elements 76 will be deflected laterally to enable them to pass the widest point 47a, but will then essentially reassume their original orientation abutting on the outer contour 47 of the locking member 46. This will securely mount the rotor 40 in the centrifuge in an axial direction.

FIG. 5 is a view of the quick-action closure 54 in a locked state thereof, in a detail from a cross-section taken along the central axis of the centrifuge of FIG. 1. Contrary to the view of FIG. 4, the actuating pin 100 here is in the position into which it is automatically moved by the action of the spring 104, if no external pressure is exerted on it in the direction of the drive shaft 12, and its shoulder 102a abuts on the associated shoulder 94b of the centering pin 94. Owing to the action of the spring 56 and the absence of the pressure exerted by the actuating pin 100 in the direction of the drive shaft 12, the locking piston 58 and the locking unit 70 mounted on the locking piston 58 will be located in the area of the locking chamber 78 which is close to the rotor. The blocking elements 76 are in their locking position between the outer contour 47 of the locking member 46 and the abutment surface 52. The quick-action closure 54 is locked.

For more clarity, FIGS. 7a and 7b are separate views each of the rotor-side detail, see FIG. 7a, and the shaft-side detail, see FIG. 7b.

LIST OF REFERENCE SIGNS 10 centrifuge
12 drive shaft
13 drive axle
14 adapter
16 lower circumferential wall
18 inner contour
20 exterior
20a front face
21 shoulder
22 upper circumferential wall
24a long segment
24b shoulder
24c short segment
25a cone
25b cylinder
26 dividing wall
28 bottom side
30 top side
32 threaded hole
34 threaded bolt
38 head
40 rotor
42 rotor hub
44 rotor central area
46 locking element
47 outer contour
47a widest point
47b control surface
48 bore
50 abutment insert
51 opening
52 abutment surface
54 quick-action closure
56 spring
58 locking piston
60a cylindrical area
60b shoulder
60c cylindrical area
62 bottom area 64 recess
66 removal direction
70 locking unit
72 connecting ring
72a locating pin
74 locking springs
76 blocking elements
78 locking chamber
80 wall
81 handle receiving area
82 lid
84 recess
90 handle
92 housing
92a outer contour
92b inner contour
94 centering pin
94a inner contour
94b shoulder
95a free end
95b cylinder
96 locking ring
100 actuating pin
100a actuating button
102 cross piece
102a shoulder
102b shoulder
104 spring

The invention claimed is:

1. A centrifuge (10), comprising:
a drive shaft (12);
a rotor (40);
said rotor (40) mounted on said drive shaft (12);
said rotor is axially detachable from said drive shaft in a removal direction (66);
a quick-action closure (54);
said quick-action closure integrated in said rotor (40) and said drive shaft (12);
said quick-action closure secures said rotor (40) against movement relative to said drive shaft (12) in said removal direction (66);
an abutment insert (50) in said drive shaft (12) is engaged with a locking member (46) of said rotor (40);
said locking member (46) is rotationally symmetrical in shape, and initially widens conically in the direction of said drive shaft (12) and then partially narrows again;
a locking unit includes at least one blocking element (76);
said at least one blocking element (76), when activated, affixes said rotor (40) relative to said drive shaft (12) and acts between said locking member (46) of said rotor (40) and said abutment insert (50) of said drive shaft (12);
said quick-action closure (54) includes a force-transmitting element (58, 72);
said at least one blocking element (76) is actively connected to an actuating element (100, 100a) via said force-transmitting element (58, 72); and,
unlocking said quick-action closure (54) is effected by moving said actuating element (100, 100a), said force-transmitting element (58, 72) and said at least one blocking element (76) relative to said locking member (46) in a direction in parallel to said drive shaft (12); and that during unlocking, said actuating element (100, 100a) is moved toward said drive shaft (12), and during locking said quick-action closure (54), said force-transmitting element (58, 72) and said at least one blocking element (76) on the one side and said locking member (46) on the other side are relatively moved toward each other into a locking position.

2. The centrifuge according to claim 1, further comprising:
a locking spring (74);
in said locking position, said at least one blocking element (76) is preloaded into said locking position by the spring force of said locking spring (74).

3. The centrifuge according to claim 1, further comprising:
plural blocking elements (76);
said plural blocking elements are positioned uniformly spaced from each other and are arranged around said locking member (46) in said locking position.

4. The centrifuge according to claim 3, further comprising:
said plural blocking elements (76) are connected to locking springs (74);
said locking springs (74) are elastically deflectable fingers;
said elastically deflectable fingers are connected to a common support (72);
said plural blocking elements (76) are preloaded in said direction of said locking member (46) of said rotor (40).

5. The centrifuge according to claim 4, further comprising:
said plural blocking elements (76), said locking springs (74) and said common support (72) form an integral unit and constitute said locking unit (70).

6. The centrifuge according to claim 3, further comprising:
said locking member (46) has a control surface (47b) for said plural blocking elements (76), which—when said rotor (40) is inserted by moving it in a direction opposite to said removal direction (66) and into said locking position of said quick-action closure (54)—will urge said plural blocking elements (76) between said locking member (46) and said abutment insert (50).

7. The centrifuge according to claim 1, further comprising:
said at least one blocking element (76) has a shape;
said locking member (46) includes segments;
said shape of said at least one blocking element (76) is adapted to an associated segment of said locking member (46) of said rotor (40).

8. The centrifuge according to claim 1, further comprising:
said locking member (46) is integrally formed with said rotor (40) and also made of the same material.

9. The centrifuge according to claim 1, further comprising: said force-transmitting element includes a locking piston (58);
said locking unit (70) is mounted on said locking piston (58);
a spring (56);
said locking piston (58) is biased into said locking position by the action of said spring (56).

10. The centrifuge according to claim 9, further comprising:
said drive shaft (12) has a stop (38);
said locking piston (58) engages said stop of said drive shaft in a maximum opening position thereof.

11. The centrifuge according to claim 1, further comprising:
said force-transmitting element includes a locking piston (58);

a locking chamber (78);

said locking chamber includes a boundary;

said abutment insert (50) is part of said boundary of said locking chamber (78);

said abutment insert of said locking chamber (78) includes a bore (51) for inserting said locking member (46) of said rotor;

said bore (51) is engaged by said at least one blocking element (76) of said locking unit (70); and, said locking unit (70), said locking piston (58) and a spring (56) are arranged in said locking chamber.

12. The centrifuge according to claim 11, further comprising:

a handle:

said at least one blocking element (76), at least one locking spring (74) and a common support (72) form an integral unit and constitute said locking unit (70); and said locking member (46), said locking chamber (78), said locking unit (70), said said locking piston, said handle (90) and/or said drive shaft (12) are mounted concentrically relative to one another.

13. The centrifuge according to claim 1, further comprising:

a plurality of locking springs (74);

plural blocking elements (76);

said plural blocking elements (76) are preloaded into said locking position by the spring force of said locking springs (74);

said drive shaft (12) includes a drive axle (13);

said locking member includes a widest conical point;

said plural blocking elements (76) for unlocking and locking said quick-action closure (54) are elastically deflected by said locking springs (74) so as to enable said plural blocking elements (76) to pass said widest conical point of said locking member (46), relative to said drive axle (13) of said drive shaft (12), of said locking member (46).

14. A centrifuge (10), comprising:

a drive shaft (12);

a rotor (40);

said rotor (40) mounted on said drive shaft (12);

said rotor is axially detachable from said drive shaft in a removal direction (66);

a quick-action closure (54);

said quick-action closure integrated in said rotor (40) and said drive shaft (12);

said quick-action closure secures said rotor (40) against movement relative to said drive shaft (12) in said removal direction (66);

an abutment insert (50) in said drive shaft (12) is engaged with a locking member (46) of said rotor (40);

a locking unit (70) includes at least one blocking element (76);

said at least one blocking element (76), when activated, affixes said rotor (40) relative to said drive shaft (12) and acts between said locking member (46) of said rotor (40) and said abutment insert (50) of said drive shaft (12);

said quick-action closure (54) includes a force-transmitting element (58, 72);

said at least one blocking element (76) is actively connected to an actuating element (100, 100*a*) via said force-transmitting element (58, 72**);

a handle (90) for removing said rotor (40) from said drive shaft when desired;

said actuating element (100, 100*a*) is formed as an actuating pin (100) which is movably mounted in said handle (90**);

said actuating pin (100) extends through said handle (90) and forms an actuating button (100*a***);

said actuating pin includes a free end protruding from said handle (90);

unlocking said quick-action closure (54) is effected by moving said actuating element (100, 100*a*), said force-transmitting element (58, 72) and said at least one blocking element (76) relative to said locking member (46) in a direction in parallel to said drive shaft (12), and that during unlocking, said actuating element (100, 100*a*) is moved toward said drive shaft (12); and during locking said quick-action closure (54), said force-transmitting element (58, 72) and said at least one blocking element (76) on the one side and said locking member (46) on the other side are relatively moved toward each other into a locking position.

\* \* \* \* \*

UNITED STATES PATENT AND TRADEMARK OFFICE
CERTIFICATE OF CORRECTION

PATENT NO. : 10,632,475 B2
APPLICATION NO. : 15/505924
DATED : April 28, 2020
INVENTOR(S) : Hoelderle et al.

Page 1 of 1

It is certified that error appears in the above-identified patent and that said Letters Patent is hereby corrected as shown below:

In the Claims

Claim 1, Column 9, Line 64, after "drive shaft" delete "(12)," and insert --(12);-- therefor.

Claim 12, Column 11, Line 19, after "said locking unit (70)," delete the first occurrence of "said".

Signed and Sealed this
Fourth Day of August, 2020

Andrei Iancu
*Director of the United States Patent and Trademark Office*